(12) United States Patent
Gabbey et al.

(10) Patent No.: US 6,648,033 B2
(45) Date of Patent: Nov. 18, 2003

(54) FUEL FILL TUBE ASSEMBLY

(75) Inventors: David John Gabbey, Pinckney, MI (US); Larry Martin Vandervoort, Spring Arbor, MI (US)

(73) Assignee: Martinrea Industries, Inc., Dexter, MI (US)

( * ) Notice: Subject to any disclaimer, the term of this patent is extended or adjusted under 35 U.S.C. 154(b) by 0 days.

(21) Appl. No.: 10/003,771

(22) Filed: Nov. 15, 2001

(65) Prior Publication Data

US 2003/0089424 A1 May 15, 2003

(51) Int. Cl.$^7$ .................................................. B65B 1/04
(52) U.S. Cl. ....................... 141/286; 141/350; 220/86.2
(58) Field of Search .......................... 141/301, 302, 141/59, 349, 350, 286; 220/86.2

(56) References Cited

U.S. PATENT DOCUMENTS

| | | | | |
|---|---|---|---|---|
| 4,630,749 A | * | 12/1986 | Armstrong et al. | 220/86.2 |
| 4,635,813 A | * | 1/1987 | Peickert | 220/86.2 |
| 4,941,587 A | * | 7/1990 | Terada | 220/86.2 |
| 4,966,299 A | * | 10/1990 | Teets et al. | 220/746 |
| 4,995,433 A | * | 2/1991 | Beicht et al. | 141/312 |
| 5,027,868 A | * | 7/1991 | Morris et al. | 141/59 |
| 5,439,129 A | * | 8/1995 | Buechler | 220/86.2 |
| 5,735,322 A | * | 4/1998 | Palvolgyi | 141/386 |

OTHER PUBLICATIONS

"Road vehicles—Filler pipes and openings of motor vehicle fuel tanks—Vapour recovery system" ISO 13331, International Organization for Standardization (ISO) Jun. 1, 1995.

* cited by examiner

Primary Examiner—Steven O. Douglas
(74) Attorney, Agent, or Firm—Gifford, Krass, Groh, Sprinkle, Anderson & Citkowski, P.C.

(57) ABSTRACT

A fuel tank fill tube assembly is disclosed for use with a conventional gasoline fill nozzle. The assembly includes a fill tube having a first tubular and cylindrical main body with a predetermined inside diameter. The fill tube further includes an enlarged diameter inlet portion joined at one end to one end of the main body. This inlet portion has a second predetermined diameter which is greater than the diameter of the main body. Both the main body and inlet portions are coaxial with each other. The inlet portion is dimensioned so that the gas fill nozzle is insertable through the inlet portion and, upon insertion, a free end of the gasoline fill nozzle is positioned within the interior of the main body. Additionally, the diameter of the main body is configured so that, upon fuel flow from the gasoline fill nozzle into the interior of the main body, a liquid seal is formed by the fuel flow from the gasoline fill nozzle within the main body.

6 Claims, 1 Drawing Sheet

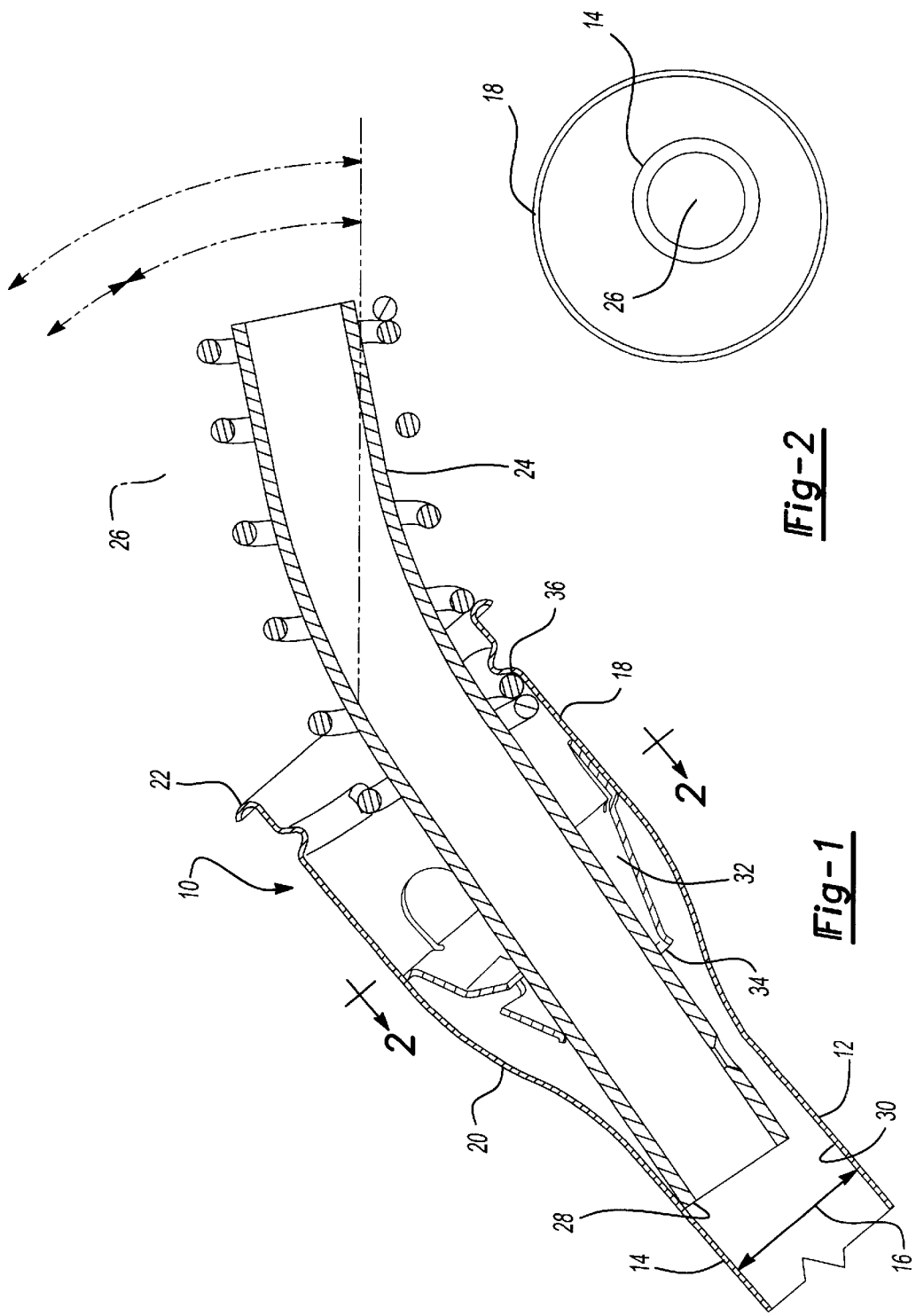

FUEL FILL TUBE ASSEMBLY

BACKGROUND OF THE INVENTION

I. Field of the Invention

The present invention relates to a fuel fill nozzle for automotive vehicles.

II. Description of Related Art

Essentially all automotive vehicles include a fuel fill tube assembly having a lower end open to the interior of a fuel tank and its upper end accessible exteriorly of the vehicle. Conventionally, the upper or inlet end of the fill tube assembly is sealingly closed by a fuel cap or other closure during normal operation of the vehicle. This fuel cap or other closure, of course, is removed from the fill tube assembly during a fueling operation.

The previously known fill tube assemblies typically comprised an elongated tubular and cylindrical main body having its lower end open to the interior of the fuel tank. Conversely, the upper end of the main body is joined to an enlarged diameter portion to which the fuel cap is removably secured. During a fueling operation, a gasoline fill nozzle is insertable through the enlarged diameter inlet portion so that a free end of the gasoline fill nozzle is positioned within the interior of the main body.

In order to prevent, or at least minimize, the introduction of leaded or diesel fuel into the fuel tank, the unleaded gasoline version of these previously known fill tube assemblies have conventionally included a normally closed flapper valve within the enlarged diameter inlet portion of the fill tube assembly. Conventionally, these flapper valves include a baffle which extends diametrically across the inlet portion of the fill tube assembly. An opening is provided through the baffle which is dimensioned to receive the fill nozzle. A spring loaded normally closed valve assembly is then mounted to the baffle to close the baffle opening at all times except during a fueling operation. During a fueling operation, the fuel nozzle is inserted through the baffle opening thus opening the valve.

In order to physically accommodate the valve structure of the flapper valve within the inlet portion of the fill tube assembly, it has been previously necessary that the baffle opening be radially offset from the center of the baffle. The radially offset opening in the baffle has, in turn, required that the axis of the main portion of the fill tube assembly be radially offset from the inlet portion of the fill tube assembly to ensure that the free end of the gasoline fill nozzle enters into the interior of the main body of the fill tube assembly during a fueling operation, while the gasoline fill nozzle is latched securely within the inlet portion.

A primary disadvantage of these previously known fill tube assemblies in which the axis of the main body is radially offset from the axis of the inlet portion of the fill tube assembly is that such a construction for the fill tube assembly is relatively expensive in manufacturing cost. Furthermore, since the main body and inlet portion are typically of a one-piece construction, the previously known fill tube assemblies in which the axis of the main body is radially offset from the axis of the inlet portion of the fill tube assembly can result in areas of weakening of the fill tube assembly where the enlarged diameter inlet portion is mechanically expanded from a smaller diameter tube.

SUMMARY OF THE PRESENT INVENTION

The present invention provides a fill tube assembly which overcomes all of the above-mentioned disadvantages of the previously known devices.

In brief, the fill tube assembly of the present invention comprises a fill tube having a tubular and cylindrical main body with a predetermined inside diameter. The fill tube further includes an enlarged diameter inlet portion joined at one end to one end of the main body. This inlet portion, furthermore, has a predetermined diameter greater than the diameter of the main body.

The main body and inlet portion are preferably of a one-piece construction and are coaxial with each other. As such, the main body and inlet portion may be relatively inexpensively constructed.

The inlet portion is dimensioned so that a gas fill nozzle is insertable through the inlet portion and, after insertion to a latched position, a free end of the fill nozzle is positioned within the interior of the main body. Additionally, the diameter of the main body is configured so that, upon fuel flow from the gas nozzle into the interior of the main body, a liquid seal is formed by the fuel flow from the gasoline fill nozzle with the main body. This liquid seal, in operation, entrains any fuel fumes that are present within the fill tube with some outside air and the incoming fuel so that the incoming fuel, together with the entrained air and fuel fumes, enters into the fuel tank. If desired, check valves may be coupled in series with the fill tube at or adjacent the fuel tank.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a longitudinal sectional view illustrating a preferred embodiment of the present invention; and FIG. 2 is a sectional view taken substantially along line 2—2 in FIG. 1.

DETAILED DESCRIPTION OF A PREFERRED EMBODIMENT OF THE PRESENT INVENTION

With reference to the drawing, a preferred embodiment of the fill tube assembly 10 of the present invention is there shown and comprises an elongated fill tube 12. The fill tube 12, furthermore, includes an elongated tubular and cylindrical main body 14 having a predetermined inside diameter 16. The fill tube 12 also includes an enlarged diameter inlet portion 18 which is joined to an end of the main body 14 by a tapered section 20. The other end of the main body 14 is fluidly connected to a fuel tank (not shown) while the other end 22 of the inlet portion 18 is adapted to receive fuel from a gasoline fuel nozzle 24.

The main body 14 of the fill tube, as well as the inlet portion 18 of the fill tube 12, are preferably of a one-piece construction. Furthermore, the main body 14 and inlet portion 18 are coaxial with each other thus having a common longitudinal axis 26.

The inlet portion 18 of the fill tube 12 is dimensioned such that the gasoline fuel nozzle 24 is insertable through the inlet portion 18 and has its free end 28 positioned within the interior 30 of the main body 14 when latched at a feature 36 within the inlet portion 18. A baffle 32 is also preferably contained within the interior of the inlet portion 18 of the fill tube 12 when intended for unleaded fuel applications. This baffle 32 includes an opening 34 through which the fuel nozzle 24 extends. This opening 34, furthermore, is dimensioned to ensure that only the properly sized fill nozzle, typically the nozzle size for unleaded gasoline, can pass through the baffle opening 34.

In practice, the diameter 16 of the main body 14 is dimensioned such that, upon the introduction of fuel from the fuel nozzle 24 and into the interior 30 of the main body 14, a liquid seal is formed between the nozzle 24 and body 14 by the fuel flow from the nozzle 24 within the main body 14. This liquid seal thus ensures that fumes generated from the fuel flow from the nozzle 24 during the filling operation and some outside air are entrained within the incoming fuel and directed into the fuel tank. In practice, the inside diameter 16 of the main body is preferably about one inch in diameter.

If desired, the fuel tank may include a check valve to limit the escape of fuel from the fuel tank and through the fill tube 12 following the refueling operation.

A primary advantage of the fill tube assembly of the present invention is that, since the main body 14 and inlet portion 18 are coaxial with each other, they may be inexpensively manufactured. Additionally, weakening of the fill tube assembly is minimized. Having described our invention, however, many modifications thereto will become apparent to those skilled in the art to which it pertains without deviation from the spirit of the invention as defined by the scope of the appended claims.

We claim:

1. A fuel tank fill tube assembly for use with a conventional gasoline fill nozzle comprising:

a fill tube having a first tubular and cylindrical main body with a predetermined inside diameter, said fill tube having an enlarged diameter inlet portion joined at one end to one end of the main body, said inlet portion having a second predetermined diameter greater than said first predetermined diameter, said main body and said inlet portion being aligned with each other, wherein said inlet portion is dimensioned so that the gasoline fill nozzle is insertable through the inlet portion and, upon insertion of the gasoline fill nozzle to a latched position, a free end of the gasoline fill nozzle is positioned within said main body, wherein said main body is dimensioned such that, upon fuel flow from the gasoline fill nozzle into the interior of said main body, a liquid seal is formed by the fuel flow from the gasoline fill nozzle within said main body.

2. The invention as defined in claim 1 wherein said predetermined inside diameter is approximately one inch.

3. The invention as defined in claim 1 wherein said main body and said inlet portion are of a one-piece construction.

4. The invention as defined in claim 3 wherein said fill tube comprises a taper extending between said one end of said main body and said one end of said inlet portion.

5. The invention as defined in claim 1 and comprising a baffle disposed in said inlet portion, said baffle having an opening adapted to receive the gasoline fill nozzle.

6. The invention as defined in claim 1 but used for liquid fuels other than gasoline.

* * * * *